J. J. STRINGER.
MEAT SCALE.
APPLICATION FILED DEC. 3, 1917.
1,288,268.
Patented Dec. 17, 1918.
4 SHEETS—SHEET 1.
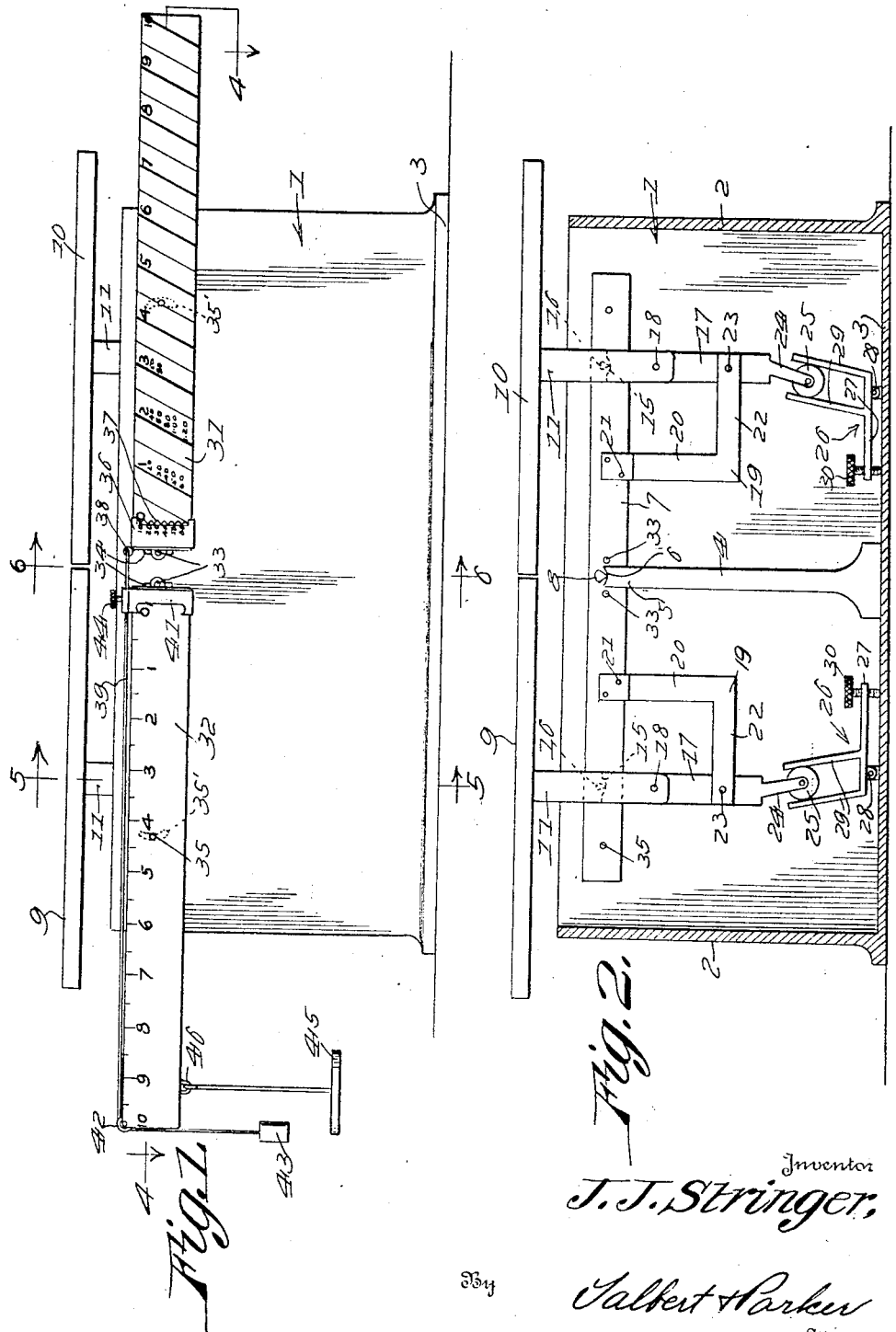
Inventor
J. J. Stringer,
By
Talbert & Parker
Attorneys

J. J. STRINGER.
MEAT SCALE.
APPLICATION FILED DEC. 3, 1917.

1,288,268.

Patented Dec. 17, 1918.
4 SHEETS—SHEET 2.

Inventor
J. J. Stringer

By Talbert Parker
Attorneys

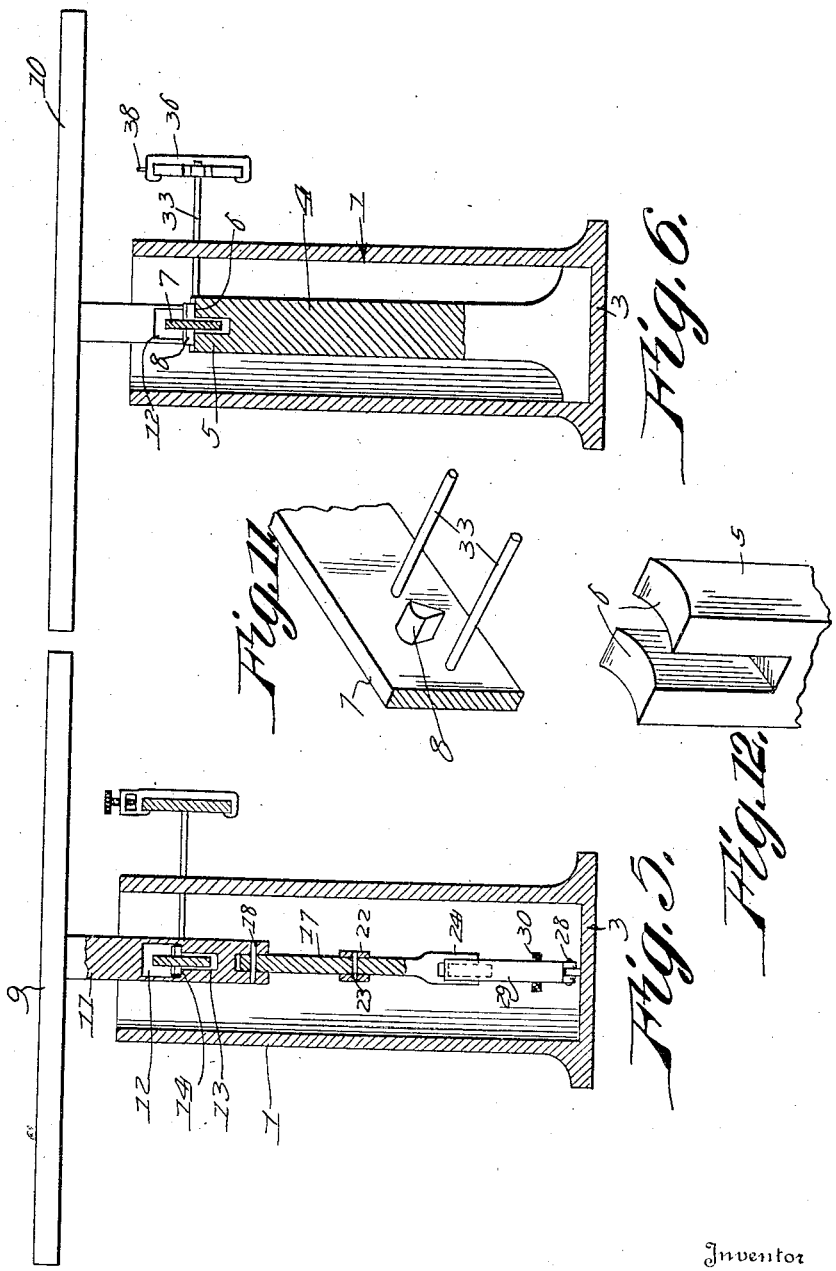

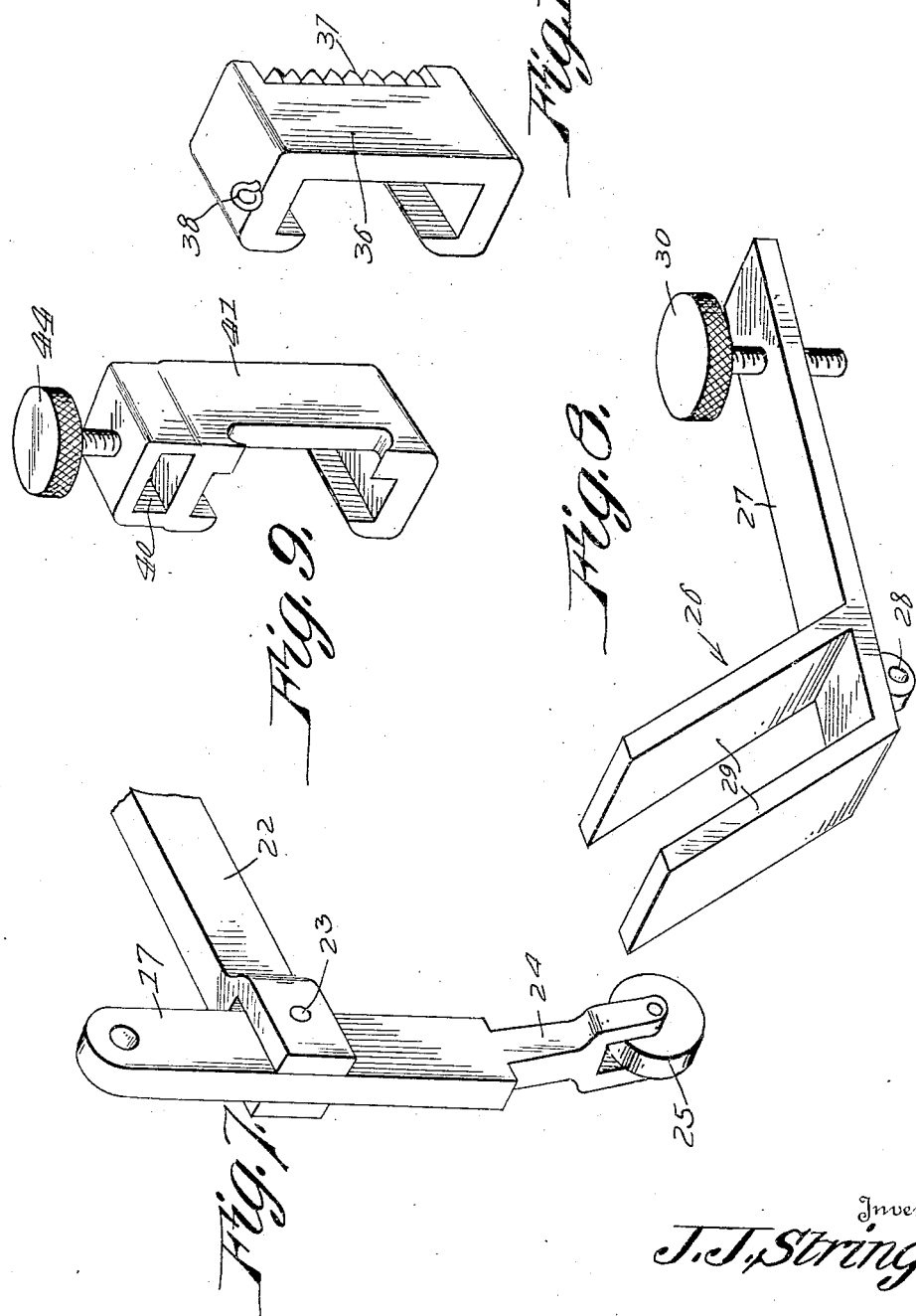

UNITED STATES PATENT OFFICE.

JOE JOHN STRINGER, OF HONEY GROVE, TEXAS.

MEAT-SCALE.

1,288,268.

Specification of Letters Patent.

Patented Dec. 17, 1918.

Application filed December 3, 1917. Serial No. 205,175.

*To all whom it may concern:*

Be it known that I, JOE JOHN STRINGER, a citizen of the United States, residing at Honey Grove, in the county of Fannin and State of Texas, have invented certain useful Improvements in Meat-Scales, of which the following is a specification, reference being had therein to the accompanying drawing.

This invention has reference generally to improvements in that class of inventions known as measuring instruments and more particularly relates to a scale, especially though not necessarily adapted for weighing meats.

The present invention has for its principal aim and object to provide a scale designed for weighing large pieces of meat while the scale is also adjustable subsequent to determining the total weight of the meat so that the butcher or merchant, etc., will be able to determine the weight of a portion of the whole piece of meat preparatory to cutting the meat, thus enabling the prospective purchaser to decide whether or not such portion is acceptable.

It is an equally important object of this invention to provide a meat weighing scale wherein means is provided for enabling the butcher to inform the prospective purchaser of the exact price of a portion of the meat before cutting the portion, thus permitting the butcher or seller to accurately determine just what profit is being made on the whole piece of meat.

As an additional object this invention contemplates the provision of a scale of the character described of such a construction that the platforms will be always maintained in horizontal planes even when subjected to the weight of the meat or the like whereby to facilitate the sliding of a portion of the whole piece of meat from one platform to the other so that such portion may be readily weighed.

The invention, as a further improvement, embraces the provision of a scale wherein means is provided for adjusting the direction of movement of the platforms for assuring of the movement of the platforms vertically above the main casing.

More particularly, this invention includes the provision of a scale of the above character wherein the poise on the poise weighing and calculating beams will be adjusted simultaneously with each other so as to assure of a quick and effective arrangement of the scale in an operative position, when it is desired to weigh a portion of the whole piece of meat.

More specific objects of this invention consist in the provision of means for operably connecting the weighing and calculating beams to the main beam; to provide a main beam of a novel construction; and to provide improved means for mounting the platforms.

Among the other aims and object of this invention may be recited the provision of a device of the character described with a view to compactness, and in which the number of parts are few, the construction simple, the cost of production low and the efficiency high.

Other improvements and novel details in the construction and arrangement of the various parts of the apparatus will be brought out more in detail in the description to follow, which for a clear understanding of the invention should be considered in connection with the accompanying drawings forming a part hereof, and wherein is disclosed for the purpose of illustration a convenient and satisfactory embodiment of the invention. It is to be noted in this connection that minor changes in the construction and arrangement of parts may be made without departing from the principle of operation of the various parts.

The preferred embodiment of the present invention is clearly illustrated in the accompanying drawings, in which:

Figure 1 is a side elevation of the scale embodying this invention;

Fig. 2 is a longitudinal section through the casing, the platforms and supporting means therefor being shown in elevation;

Fig. 5 is an enlarged transverse section taken on line 5—5 of Fig. 1 in the direction in which the arrows point; the platform being shown in elevation;

Fig. 6 is an enlarged transverse section taken on line 6—6 of Fig. 1 in the direction in which the arrows point;

Fig. 7 is a perspective detail of one of the links forming a part of the platform supporting means;

Fig. 8 is a perspective detail of one of the adjustable guides;

Fig. 9 is a perspective detail of the weighing beam poise;

Fig. 10 is a perspective detail of the calculating beam poise;

Fig. 11 is a perspective detail of a portion of the main beam;

Fig. 12 is a perspective detail of the upper end of the main supporting standard.

Similar characters of reference are employed in all the above described views, to indicate corresponding parts.

Figure 3:
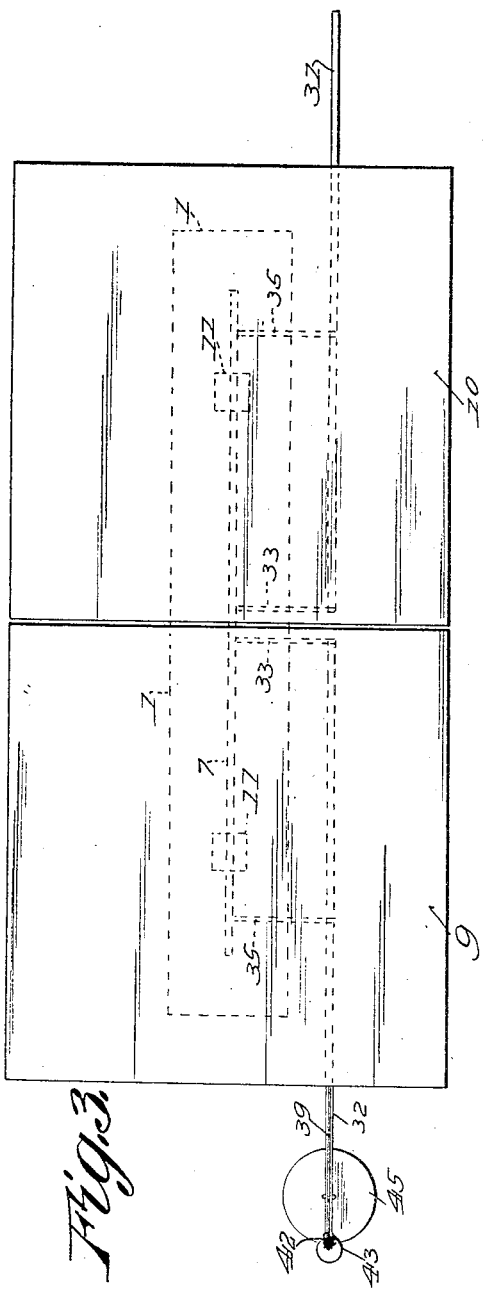
Fig. 3 is a top plan view of the scale.
Figure 4:
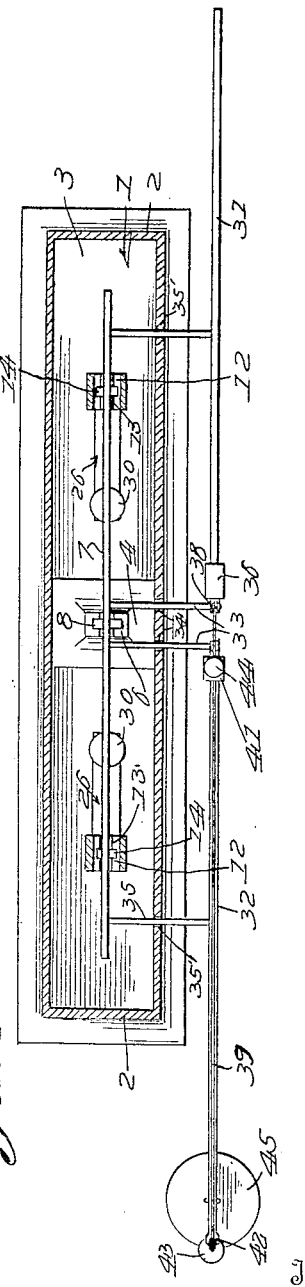
Fig. 4 is a horizontal longitudinal sectional view taken through the casing, the platforms being removed.

Referring, now, more particularly, to the accompanying drawings, there is provided a casing 1 of a rectangular configuration and preferably consisting of side walls 2 and a bottom 3 the upper end being open. A standard 4 is rigidly mounted centrally of the bottom of the casing and terminates short of the upper edge of the casing, the upper end being bifurcated forming spaced arms 5 the upper edges of which are provided with transverse recesses 6. Disposed between the arms is a main beam 7 supported by a knife edge pivot pin 8 which extends centrally therethrough, the knife edge thereof engaging the recesses 6. Weighing platforms 9 and 10 are disposed above the casing while floating standards 11 depend centrally from the under surface thereof and are each provided at points substantially intermediate the ends with transverse openings 12 the lower portion of each opening being reduced as at 13 providing opposed shoulders 14. These shoulders are provided with curved recesses 15 for coöperation with a knife edge pivot 16 extending transversely through the main beam 7 adjacent the respective ends.

With a view toward providing the improved means for supporting the platforms so that they will always move in a vertical plane and be at all times positioned in horizontal planes, levers 17 have their upper ends pivotally connected by means of suitable fastening devices 18 to the lower ends of the floating standards 11 while angle arms 19 have one of their portions 20 rigidly secured by means of suitable fastening devices 21 to the main beam 7 upon opposite sides of the knife edge pivot 8 while the other portions 22 of the angle arms extend in opposite directions with respect to each other and are pivotally connected by means of suitable fastening devices 23 to the levers 17 at points substantially intermediate the ends thereof as indicated in Fig. 2. Shanks 24 depend at an inclination from the lower ends of the levers, and rotatably support rollers 25. Coöperating with the rollers are adjustable guides indicated in their entireties by the numeral 26. In the present instance each guide consists of a base 27 pivotally mounted as at 28 to the bottom 3 of the casing. Spaced parallel arms 29 extend at an inclination from the outer end of the base above the pivot pin so as to receive the adjacent roller 25 therebetween. A set screw 30 is adjustably mounted through the base 27 adjacent the opposite end and bears against the bottom 3 in varying the inclination of the arms 29. By the arrangement of the adjustable guides 26, the levers 17 and the angle arms 19 it will be appreciated that the platforms 9 and 10 will at all times be maintained in horizontal planes and will practically always move in vertical planes, since by adjusting the screws 30 the levers 17 will be correspondingly adjusted with respect to the substantially stationary angle arms 22 and owing to the fastening devices 18 which provide a reversible joint between the levers in the floating standard, the standards will likewise be adjusted. In this connection it will be observed that a vertical swinging movement of the main beam 7 will not in any manner affect the direction of movement of the platforms 9 and 10 thus facilitating the movement of a portion of a piece of meat from the platform 10 to the platform 9 for a purpose that will hereinafter become apparent.

As intimated, improved means have been provided for enabling a seller and a buyer of a piece of meat for instance to accurately determine the cost of a portion of the piece of meat before cutting the meat. In reducing this feature of the invention to practice a poise calculating beam 31 and a poise weighing beam 32 are provided and are disposed in front of the outer face of the front wall of the casing being rigidly connected to the main beam 7 at their inner ends by elongated pins 33 which operate in slots 34 in the front wall of the casing and which are rigidly connected to the main beam 7 upon opposite sides of the knife edge pivot 8. These beams are also rigidly mounted at points substantially intermediate their ends on pins 35 which operate in arcuate slots 35' in the front wall and adjacent the respective ends and which are rigidly connected adjacent the extreme ends of the main beam as indicated in the drawings. The calculating beam 31 is marked or otherwise provided with spaced diagonally extending lines as indicated in Fig. 1 while in the spaces between certain of the lines numerals from one to ten are successively arranged from the inner end toward the outer end so as to represent the number of pounds. Likewise the weighing beam 32 is provided with numerals one to ten inclusive which are arranged successively from the inner end toward the outer end and are indicative of the number of pounds, for a purpose that will presently appear. A poise 36 is slidably mounted on the calculating beam 31 the inner edge thereof being provided with teeth 37 for coöperation with price marks adapted to be arranged adjacent the diagonally arranged lines and successively from the lower edge toward the upper edge and indicative of the exact price to enable the butcher to inform the prospective purchaser of the amount that a certain piece of meat will cost. An eye 38 is formed on the upper end of the poise 36 while a flexible element 39 is connected thereto and is slidably arranged through a slot 40 in the upper end of another poise 41 slidably mounted on the weighing beam 32, the flexible element 39 being extended and trained about the outer end of the weighing beam 32 as indicated by the numeral 42 while a weight 43 is mounted on the lower depending portion thereof so as to at all times maintain the flexible element taut. A set screw 44 is adjustably mounted in the upper end of the poise 41 and passes into the slot so as to clamp the flexible element in a substantially rigid position when desired. A weight support 45 is pivotally supported from the outer end of the weighing beam as indicated by the numeral 46 and this weight support and the weighing beam 32 are of a weight equivalent to the weight of the beam 31, so that under normal conditions when there is nothing on the platforms the beams are in a horizontal position.

The mode of operation of the present invention may be reviewed as follows:

Assuming that the parts have been assembled in the manner described and as indicated in the drawings a large piece of meat not shown is placed on the platform 10 whereupon the poise 41 is slid to the left on the beam 32 until the platform is balanced for instance at 10 pounds whereupon the set screw 44 is tightened. If the customer desires two pounds of meat the poise 36 is slid to the right to the 2 pound mark and because of the fact that the set screw is rigidly engaged on the flexible element 39 the poise 41 is drawn back on the poise 32 to the numeral 8. This causes the platform 10 to move downward a slight extent while the beams 31 and 32 will also move correspondingly to the direction assumed by the main beam 7. The meat is now lifted and a small portion thereof arranged on the adjacent edge of the platform 9 and all that is necessary to do is to adjust the whole piece of meat until the platforms 9 and 10 lie in the same horizontal plane which will be indicative of the fact that the portion of the meat on the platform 9 weighs 2 pounds thus enabling the prospective purchaser to determine whether or not such portion is acceptable. Likewise this permits of the butcher or seller to determine at what price per pound the portion will be sold and also the total cost thereof. The movement of the platforms is controlled of course by adjusting the set screw 30 when so desired so that the parallel arms 28 will coöperate with the adjacent rollers 25, as is apparent.

As many changes could be made in the above construction and many apparently widely different embodiments of this invention could be made without departing from the scope of the invention it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention which, as a matter of language might be said to fall therebetween.

Having thus fully described this invention, what is claimed as new and desired to be secured by Letters Patents, is:—

1. A scale of the character described including a pivotally mounted main beam, platforms operatively connected to the main beam, adjusting means operably connected to the platform for assuring of the maintenance of the platforms in horizontal planes during vertical movement, weighing and calculating beams connected to respective ends of the main beam, poises slidable on the last mentioned beams, flexible means connected to one of the poises and slidable through the other poise and means for removably fastening the flexible means to the poise through which the flexible means is slidable for permitting the poise to be moved at times simultaneously.

2. A scale of the character described including supporting standards, beam pivots mounted thereon, platforms pivotally connected to the respective ends of the main beam, levers movably associated with the platforms, connections between the main beam and the adjacent levers, adjusting means operatively connected to the levers, and coöperating with the connections for assuring of the maintenance of the platforms in horizontal planes during vertical movement.

3. A scale of the character described including a supporting standard, a main beam pivotally mounted in the upper end thereof, platforms, floating standards depending therefrom and pivotally connected to the respective ends of the main beam, levers movably connected to the lower ends of the floating standards, angle arms rigidly connected to the main beams and pivoted to the levers, and adjusting means operatively connected to the levers and coöperating with levers and the angle arms in assuring of the maintenance of the platforms in horizontal planes during vertical movement.

4. A scale of the character described including a supporting standard, a main beam pivotally mounted in the upper end thereof, platforms, floating standards depending therefrom and pivotally connected to the respective ends of the main beam, levers movably connected to the lower ends of the floating standards, angle arms rigidly connected to the main beams and pivoted to the levers, adjusting means operatively connected to the levers coöperating with the angle arms in assuring of the maintenance of the platforms in horizontal planes during vertical movement, weighing and calculating beams operatively connected to the respective ends of the main beam, and poise slidably mounted on the weighing and calculating beams.

5. A scale of the character described including a supporting standard, a main beam pivotally connected to the upper end thereof, platforms, floating standards depending therefrom and pivotally connected to the respective ends of the main beam, levers pivotally connected to the lower ends of the floating standards, angle arms rigidly connected adjacent the respective ends of the main beam and pivotally connected to the levers, rollers operably mounted on the lower ends of the levers, pivotally mounted guides for operatively receiving the rollers, and means for adjusting the guides for assuring of the maintenance of the platforms in horizontal planes during vertical movement.

6. A scale of the character described including a casing, a supporting standard mounted centrally therein, a main beam pivotally connected to the upper end of the supporting standard, platforms disposed above the casing, floating standards depending from the platforms and provided with openings approximately intermediate the ends for arrangement about the respective ends of the main beam, means for pivotally connecting the floating standards to the main beam, levers pivotally connected to the lower ends of the standards, angle arms rigidly connected adjacent the respective ends of the standards and pivotally connected intermediate the ends of the levers, inclined shanks on the lower ends of the levers, rollers rotatably mounted in the shanks, guides pivotally mounted in the casing, and an adjusting screw for adjusting the guides for consequently assuring of the maintenance of the platforms in horizontal planes during vertical movement.

7. A scale of the character described including a casing, a supporting standard mounted centrally therein, a main beam pivotally connected to the upper end of the supporting standard, platforms disposed above the casing, floating standards depending from the platforms and provided with openings approximately intermediate the endse for arrangement about the respective ends of the main beam, means for pivotally connecting the floating standards to the main beam, levers pivotally connected to the lower ends of the standards, angle arms rigidly connected to the adjacent respective ends of the standards and pivotally connected intermediate the ends of the levers, inclined shanks on the lower ends of the levers, rollers rotatably mounted in the shanks, guides pivotally mounted in the casing, an adjusting screw for adjusting the guides for consequently assuring of the maintenance of the platforms in horizontal planes during vertical movement, weighing and calculating beams disposed exteriorly of the casing and operably connected to the respective ends of the main beam, and poises slidably mounted on the weighing and calculating beams.

8. A scale of the character described including a casing, a pivotally mounted main beam therein, platforms positioned above the casing and operably connected to the respective ends of the main beam, coöperative adjusting means mounted in the casing and operatively connected to the platforms for assuring of the maintenance of the platforms in horizontal planes during vertical movement, a weighing beam disposed exteriorly of the casing and operatively connected to one end of the main beam, a calculating beam disposed exteriorly of the casing and operatively connected to the opposite end of the main beam, poises slidably mounted on the weighing and calculating beams, flexible means connected to the poise on the calculating beams slidable through the poise on the weighing beam, and means for removably fastening the flexible means to the poise on the weighing means so that the poise may be at times moved simultaneously.

9. A scale of the character described including a casing, a pivotally mounted main beam therein, platforms positioned above the casing and operably connected to the respective ends of the main beam, coöperative adjusting means mounted in the casing and operatively connected to the platforms for assuring of the maintenance of the platforms in horizontal planes during vertical movement, a weighing beam disposed exteriorly of the casing and operatively connected to one end of the main beam, a calculating beam disposed exteriorly of the casing and operatively connected to the opposite end of the main beam, poises slidably mounted on the weighing and calculating beams, a flexible element rigidly connected to the poise on the calculating beam and slidably mounted through the poise on the weighing beam and trained about the outer end of the weighing beam, a weight carried by the outer end of the flexible element for holding the same taut, and a set screw adjustably mounted in the poise on the weighing beam for removably fastening the flexible element rigidly with respect to the poise on the weighing beam so that the poise may at times be moved simultaneously with each other.

In testimony whereof I affix my signature.

JOE JOHN STRINGER.

Copies of this patent may be obtained for five cents each, by addressing the "Commissioner of Patents, Washington, D. C."